(12) United States Patent
Longdill et al.

(10) Patent No.: US 7,713,102 B2
(45) Date of Patent: May 11, 2010

(54) AMPHIBIOUS VEHICLE SPEED CHANGE TRANSMISSION ARRANGEMENT

(75) Inventors: Simon James Longdill, Auckland (NZ); Hans Weekers, Auckland (NZ); Stephen John Briggs, Auckland (NZ)

(73) Assignee: Gibbs Technologies Ltd, Warwickshire (GB)

( * ) Notice: Subject to any disclaimer, the term of this patent is extended or adjusted under 35 U.S.C. 154(b) by 0 days.

(21) Appl. No.: 11/250,173

(22) Filed: Oct. 13, 2005

(65) Prior Publication Data

US 2006/0172626 A1 Aug. 3, 2006

(30) Foreign Application Priority Data

Oct. 15, 2004 (GB) .................................. 0422954.8

(51) Int. Cl.
*B60F 3/00* (2006.01)
*B63H 19/08* (2006.01)
*B63B 35/73* (2006.01)

(52) U.S. Cl. ................. 440/12.5; 440/12.54; 440/12.59; 114/55.5

(58) Field of Classification Search ................. 440/12.5, 440/12.54, 12.59, 75; 114/55.5; 74/393
See application file for complete search history.

(56) References Cited

U.S. PATENT DOCUMENTS

| | | | |
|---|---|---|---|
| 4,241,686 A | 12/1980 | Westphalen | |
| 4,387,661 A | 6/1983 | Duff | |
| 4,744,324 A | 5/1988 | Martimaas | |
| 5,562,066 A | 10/1996 | Gere | |
| 5,690,046 A * | 11/1997 | Grzech, Jr. | .................. 440/12.5 |
| 6,182,784 B1 | 2/2001 | Pestonik | |
| 6,505,694 B2 * | 1/2003 | Maguire | ..................... 180/9.1 |
| 6,540,569 B1 * | 4/2003 | Gong | ........................ 440/12.5 |
| 6,575,796 B1 | 6/2003 | McDowell | |
| 6,672,916 B1 * | 1/2004 | Lent-Phillips et al. | ...... 440/12.5 |
| 6,755,269 B1 | 6/2004 | Davis | |
| 2003/0060095 A1 | 3/2003 | Gong | |
| 2004/0009717 A1 | 1/2004 | Roycroft | |
| 2005/0101199 A1 * | 5/2005 | Gibbs | ........................ 440/12.5 |
| 2006/0121802 A1 | 6/2006 | Brown | |

FOREIGN PATENT DOCUMENTS

| | | |
|---|---|---|
| GB | 2254831 A | 10/1992 |
| JP | 02-124306 A | 5/1990 |
| LU | 84437 A1 | 10/1982 |
| WO | WO 95/23074 A1 | 8/1995 |
| WO | WO 0216158 A1 * | 2/2002 |

* cited by examiner

*Primary Examiner*—Daniel V Venne
(74) *Attorney, Agent, or Firm*—Fulwider Patton LLP (57) ABSTRACT

A power train configuration for an amphibious vehicle especially well suited for sit-astride applications. A prime mover drives a marine propulsion unit and/or at least one road wheel wherein the such road wheel is driven through a speed-change transmission. The speed-transmission is positioned above or below the axis of the prime mover's output shaft and preferably such that its input and output shafts are aligned at an angle of up to 90 degrees relative to the vehicle's longitudinal and lateral axes and/or the axis of the prime mover's output shaft.

12 Claims, 5 Drawing Sheets

AMPHIBIOUS VEHICLE SPEED CHANGE TRANSMISSION ARRANGEMENT

CROSS-REFERENCES TO RELATED APPLICATIONS

This application claims priority from Great Britain Application Serial No. 0422954.8, filed Oct. 15, 2004.

BACKGROUND OF THE INVENTION

The present invention relates to an amphibious vehicle capable of powered travel on land and water. The present invention relates in particular, but not exclusively, to an amphibious vehicle in which a user sits astride the vehicle in the manner of a motorcycle, jet ski, quad bike, or the like.

Amphibious vehicles capable of powered travel on both land and water are known. In a typical arrangement, a prime mover (such as an engine or electric motor) is arranged to provide drive to a marine propulsion unit to propel the vehicle on water and to provide drive to one or more road wheels for travel on land.

Because of the need to drive a marine propulsion unit and at least one road wheel, the power train of an amphibious vehicle is often more complex than that of a conventional road going vehicle or marine only craft. This can give rise to difficulties in designing a power train to be accommodated in the limited available space, whilst also ensuring that the weight distribution is satisfactory for both land and marine usage. This problem is particularly acute for smaller "sit-astride" type amphibious vehicles that are similar in form to motorcycles, jet skis, or quad bikes. Such vehicles tend to have narrower, taller bodywork that makes it difficult to accommodate a conventional amphibious vehicle power train.

There is a need, therefore, for an amphibious vehicle having an improved or alternative power train layout that can be more easily accommodated in a smaller or narrower space, particularly for a sit-astride type amphibious vehicle.

SUMMARY OF THE INVENTION

According to an aspect of the present invention, there is provided an amphibious vehicle having a prime mover that drives a marine propulsion unit and/or at least one road wheel wherein the such road wheel is driven through a speed-change transmission. The speed-transmission is positioned above or below the axis of the prime mover's output shaft and preferably such that its input and output shafts are aligned at an angle of up to 90 degrees relative to the vehicle's longitudinal and lateral axes and/or the axis of the prime mover's output shaft.

It is a particular advantage of the present invention that the transmission can be positioned either above or below the axis of the prime mover output shaft, as this enables the overall length of the power train to be reduced without unduly increasing the overall width of the power train. The invention is particularly applicable for sit-astride type amphibious vehicles in which the engine compartment is generally thinner and taller than in other types of amphibious vehicles.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
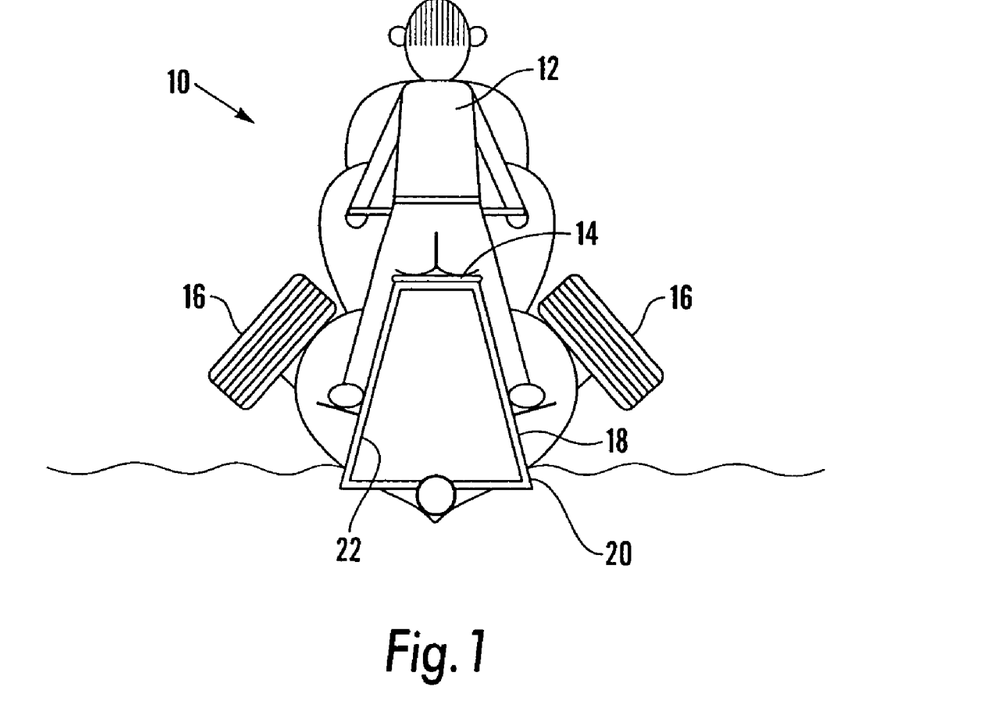
FIG. 1 is a schematic, partly sectioned, rear view of a "sit-astride" amphibious vehicle in accordance with the invention.

With reference to FIG. 1, there is shown an amphibious vehicle 10. The vehicle 10 is a "sit-astride" type of vehicle in which a user 12 sits astride a saddle 14, in a manner similar to that of a motorcycle, jet ski, quad bike or the like.

The vehicle 10 has two driven road wheels 16 at the rear. The road wheels 16 are mounted such that they can be moved between a retracted position in which they are elevated for use of the vehicle in water (as shown in FIG. 1) and a protracted position in which the wheels are aligned generally vertically, such that the main body 18 of the vehicle can be supported clear of the ground on the wheels. Any suitable wheel retraction apparatus can be used to mount the rear wheels 16. For example, the rear wheels 16 may be mounted in accordance with the arrangement disclosed in International Patent Application No. PCT/NZ95/0013 published as WO 95/23074, the contents of which are hereby incorporated. Such a retractable wheel arrangement is particularly helpful where the vehicle is configured to plane over water.

For the avoidance of doubt, references to "vertical" or "vertically" throughout this specification, including the claims, should be understood as relating to a direction from top to bottom (or vice versa) of the vehicle when it is supported by its wheels or by its hull in an orientation conventional for locomotion; rather than a direction that is necessarily orthogonal to the horizontal. The terms height, width and length of the vehicle, should be construed accordingly.

The vehicle has longitudinal and transverse axes. The longitudinal axis extends substantially perpendicular to the vertical, through a point substantially at the centre of the width and height of the vehicle, from front to back and vice versa. The transverse axis extends substantially perpendicular to the vertical, through a point substantially at the centre of the length and height of the vehicle, from left to right and vice versa.

The vehicle 10 may also be provided with a further road wheel or wheels (not shown) towards the front of the vehicle. The front wheel or wheels may also be capable of being moved between retracted and protracted positions and will be adapted to steer the vehicle on land in a manner well known in the art. In a preferred embodiment, the vehicle 10 has two front wheels (not shown).

The main body 18 of the vehicle has bodywork 20 forming a compartment 22 for housing at least part of a power train (indicated generally at 24 in FIG. 2) for the vehicle 10. As can be seen from FIG. 1, the compartment 22 tends to be rather narrow and tall in order that the users legs can be accommodated on either side.

Figure 2:
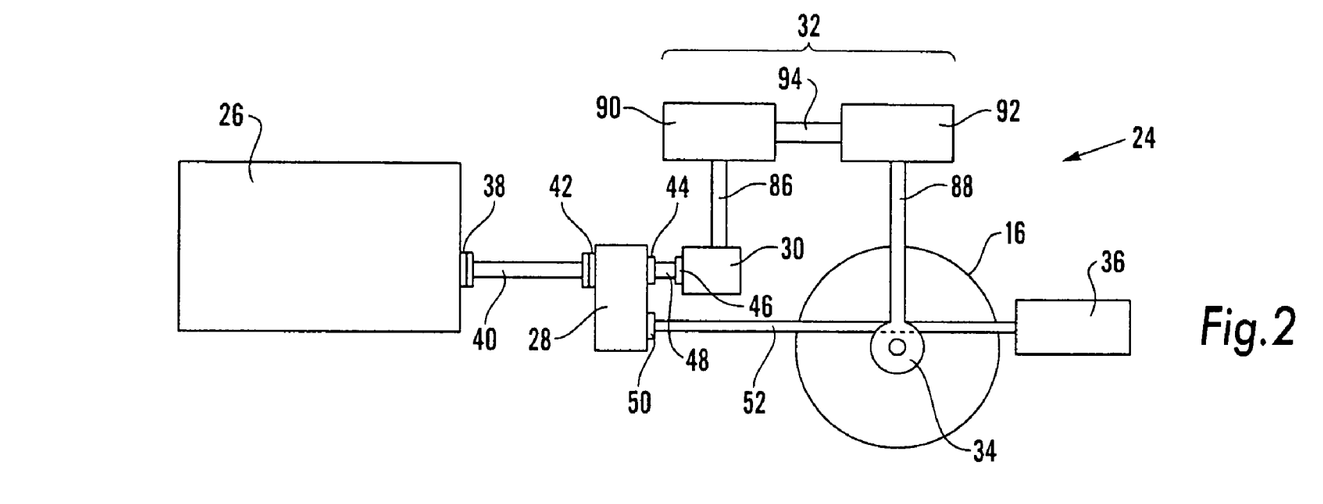
FIG. 2 is a schematic side elevation of a power train for use in the vehicle of FIG. 1.
Figure 3:
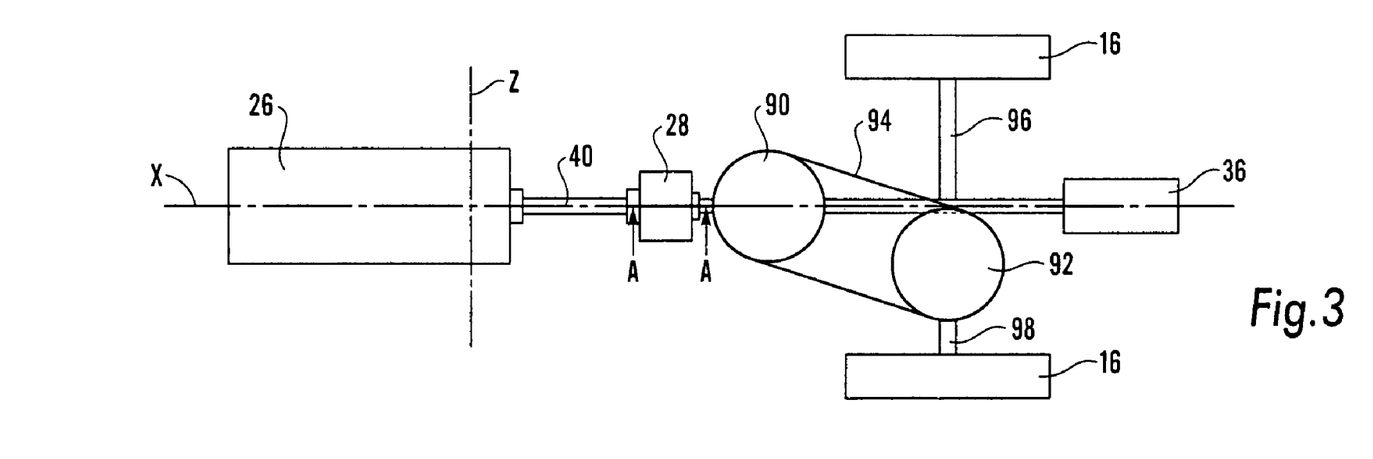
FIG. 3 is a schematic plan view of the power train of FIG. 2.

A first embodiment of a power train 24 for use with the vehicle 10 shown in FIG. 1 can be seen in FIGS. 2 and 3. The power train 24 includes a prime mover 26, a transfer box 28, a bevel gear box 30, a speed change transmission 32, a rear differential 34 and a marine propulsion unit 36.

The prime mover 26 will typically be an internal combustion engine but could be any suitable type of prime mover, such as an electric motor or a hybrid engine and motor combination, for example.

As will be described in more detail below, the prime mover 26 provides drive to both the rear wheels 16 of the vehicle and the marine propulsion unit 36.

The prime mover 26 is located towards the front of the vehicle and has an output shaft 38 that faces the rear of the vehicle for connection with the transfer box 28. Where the prime mover 26 is an engine, the output shaft may be the crankshaft of the engine. It will be noted that the axis of rotation of the prime mover output shaft 38 extends in a longitudinal direction of the vehicle. In the present embodiment, the axis of rotation of the prime mover output shaft is inline with, or at least parallel to, the longitudinal axis of the vehicle, as indicated at X in FIG. 3. However, it will be appreciated that this need not be the case. The prime mover could be mounted so that the axis of rotation of its output shaft is inclined to the longitudinal axis of vehicle. Indeed, the prime mover 26 could be mounted transversely so that the axis of rotation of the prime mover output shaft 38 extends in a lateral direction of the vehicle, as indicated at Z in FIG. 3.

A main drive shaft 40 is connected between the output shaft 38 of the prime mover and an input or primary shaft 42 of the transfer box. Where the prime mover is an engine, the main drive shaft 40 may be attached to a flywheel (not shown) mounted to the prime mover output shaft 38 in a manner well known in the art.

The transfer box 28 has two output shafts, a first land drive output shaft 44 is connected to an input shaft 46 of the bevel gear box 30 by a further drive shaft 48. A second output shaft 50 of the transfer box comprises a marine propulsion output shaft and is connected to the marine propulsion unit 36 by a yet further drive shaft 52.

The transfer box 28 is arranged to selectively couple drive from the prime mover 26 to the road wheels 16 and/or the marine propulsion unit 36. The transfer box 28 also includes a reverse gear mechanism to enable the direction of drive to the road wheels 16 to be reversed.

Figure 4A:
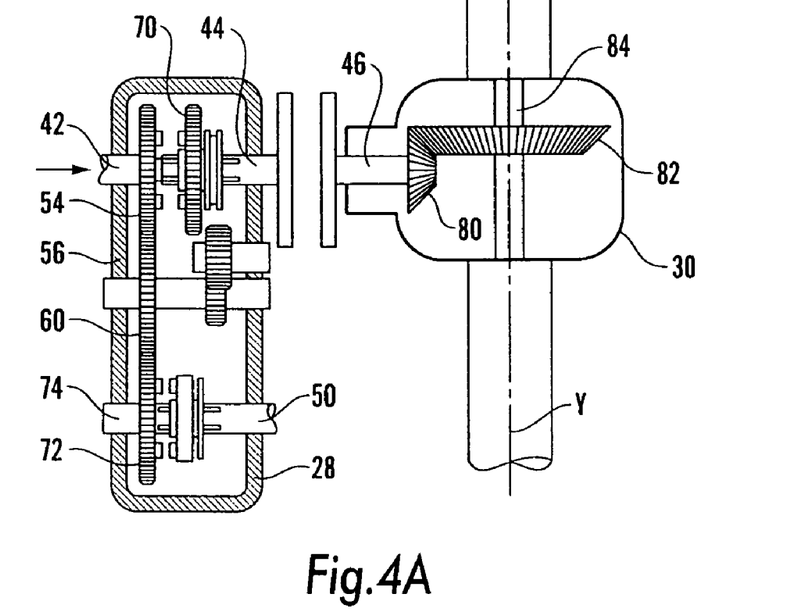
FIGS. 4A to 4E are cross sectional views through a transfer gearbox of the power train of FIGS. 2 and 3, taken on line A-A of FIG. 3.
Figure 4B:
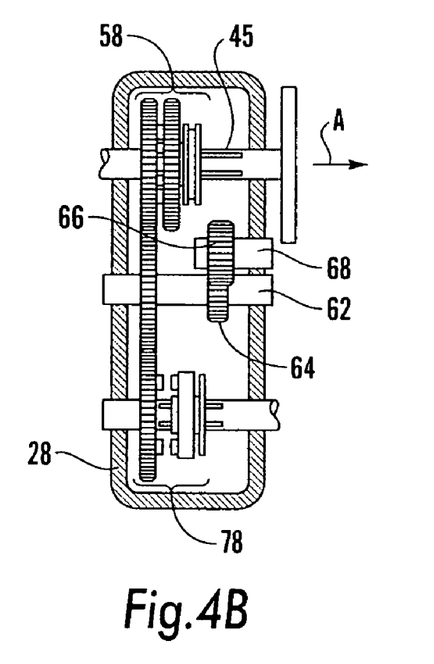
Figure 4C:
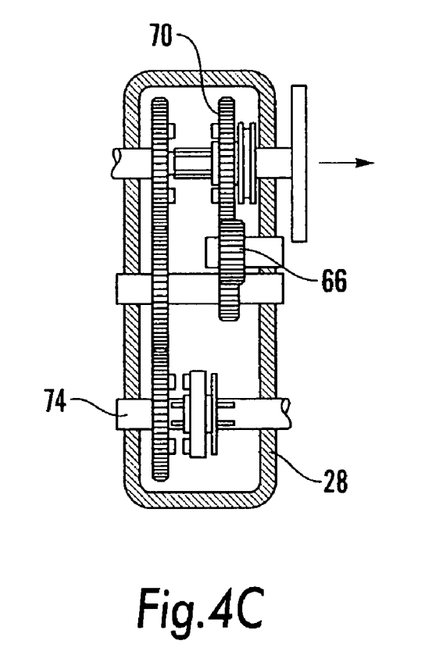
Figure 4D:
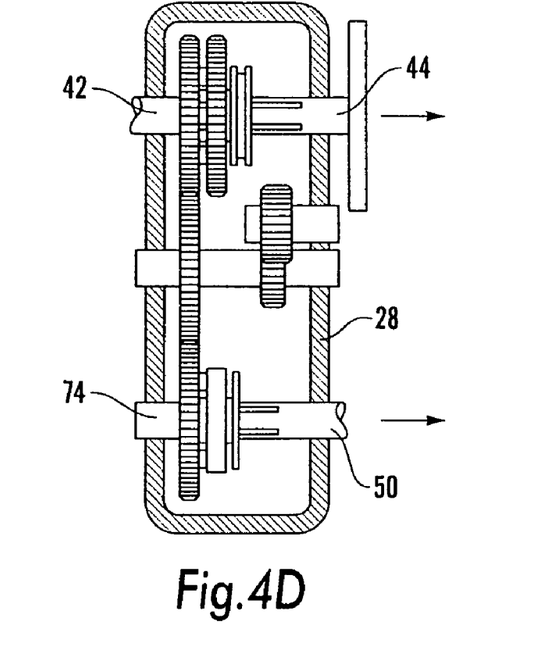

The detailed construction of the transfer box 28 can be seen in FIGS. 4A to 4E. As already described, the output shaft 38 of the prime mover is connected to the primary or input shaft 42 of the transfer box 28. An input gear 54 is mounted to and rotates with the primary shaft 42. One end of the primary shaft is supported for rotation in the casing 56 of the transfer box 28 whilst the other end is in rotational engagement with the land drive output shaft 44. A first dog clutch 58 enables the primary shaft 42 and the land drive output shaft 44 to be coupled together as shown in FIGS. 4B and 4D to transfer drive to the bevel gear box 30, which is also shown schematically in FIG. 4A.

An intermediate gear 60 is mounted to a secondary shaft 62, which is itself mounted for rotation in the casing 56 of transfer box 28 at either end. The intermediate gear 60 is in constant mesh with the input gear 54 and is mounted for rotation with, or may be formed on, the secondary shaft 62. A reverse input gear 64 is also mounted for rotation with, or may be formed on, the secondary shaft 62. A reverse idler gear 66 is in constant mesh with the reverse input gear 64 and is rotatably supported on an idler shaft 68. A reverse land drive output gear 70 is associated with a movable selector portion of the first dog clutch 58. The moveable selector portion of the first dog clutch 58 is slidably engaged with the land drive output shaft 44 by means of splines 45. As shown in FIG. 4C, the selector portion of the first dog clutch 58 can be moved to bring the reverse land drive output gear 70 into mesh with the reverse idler gear 66 to enable drive to be transferred from the output shaft 38 of the prime mover to the bevel gear box 30 but in a reverse direction.

Figure 4E:
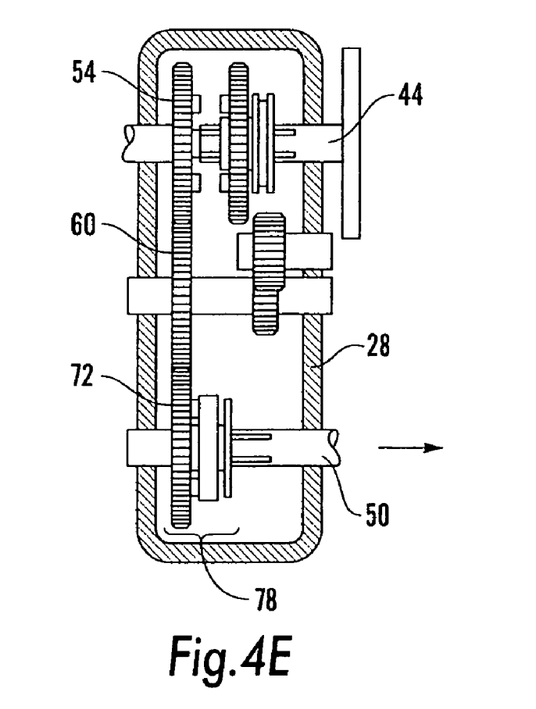

A marine propulsion input gear 72 is mounted to a marine propulsion input shaft 74 that is rotationally supported at one end in the transfer box casing 56. The other end of the marine propulsion input shaft 74 rotationally engages with the marine propulsion output shaft 50. A second dog clutch 78 is provided to enable the marine propulsion input shaft 74 and the marine propulsion output shaft 50 to be rotationally coupled. With the second dog clutch 78 engaged, as shown in FIGS. 4D & 4E, drive is transferred from the prime mover output shaft 38 via the input gear 54, the intermediate gear 60, the marine propulsion input gear 72 and the second dog clutch 78 to the marine propulsion output shaft 50.

By appropriate engagement of the first and second dog clutches 58, 78, and the reverse land drive output gear 70 it is possible to independently and selectively transfer drive from the prime mover 26 to the marine propulsion unit 36 and/or to the road wheels 16 and to reverse the direction of drive to the road wheels. FIG. 4A shows the transfer box in neutral with both the first and second dog clutches 58, 78 disengaged and no reverse gear selected. FIG. 4B, shows the transfer box with forward drive to the road wheels only (as indicated by arrow A) selected. In this case, the first dog clutch 58 is engaged and the second dog clutch 78 disengaged. FIG. 4C shows the moveable selector portion of the first dog clutch 58 moved such that the reverse land drive output gear 70 is engaged with the reverse idler gear 66 and with the second dog clutch 78 disengaged. This arrangement provides reverse drive to the road wheels 16 only. FIG. 4D shows both dog clutches 58, 78 engaged to provide drive to both the road wheels 16 and the marine propulsion unit 36. Finally, FIG. 4E shows the second dog clutch 78 engaged but the first dog clutch 58 disengaged and no reverse gear selected. Thus this arrangement would provide drive to the marine propulsion unit 36 only.

It will be understood that the transfer box 28 may also include a reduction gearbox type arrangement, having a ratio of 2:1 for example, in communication with the marine propulsion unit 36.

As already described, the land drive output shaft 44 of the transfer box 28 is connected to an input shaft 46 of the bevel gear box 30 by a drive shaft 48. The bevel gear box 30 comprises at least a pair of bevel gears 80, 82 arranged to turn the direction of the drive output from the transfer box through 90 degrees. To this end, a first bevel gear 80 is rotationally fast with the bevel gear box input shaft 46 whilst the second bevel gear 82 is rotationally fast with an output shaft 84 of the bevel gearbox. The output shaft 84 of the bevel gear box projects upwardly and has an axis of rotation Y that extends generally in a vertical direction of the vehicle.

The speed change transmission 32 is positioned above the bevel gear box 30 and has an input shaft 86 and an output shaft 88 both of which extend in a downward direction of the vehicle. In the present embodiment, the input shaft 86 of the speed change transmission is positioned in line with and is connected directly to the output shaft 84 of the bevel gear box.

It should be noted that the axes of rotation of the input and output shafts 86, 88 of the speed change transmission are orthogonal to a plane that extends both in a longitudinal and a lateral direction of the vehicle, i.e. a plane which includes both an axis (X in FIG. 3) running longitudinally of the vehicle and an axis (Z in FIG. 3) running transversely of the vehicle. In the present embodiment, the prime mover 28 is positioned such that the axis of rotation of its output shaft 38 is aligned generally horizontally and the axes of rotation of the input and output shafts 86, 88 of the speed change transmission are orthogonal to a plane that includes the axis of rotation of the prime mover output shaft 38 and extends transversely of the vehicle. However, it should be understood that the axes of rotation of the speed change transmission input and output shafts 86, 88 need not be orthogonal to the said plane that includes the axis of rotation of the prime mover output shaft.

Although the invention has been described with reference to the axis of rotation of the speed change transmission input shaft 86 being angled generally orthogonal, i.e. at 90 degrees, to a longitudinal and transverse (or lateral) plane of the vehicle, the axis of rotation of the input shaft 86 can also be arranged at other angles, such as might be required by the internal configuration of the vehicle: For example, the axis of rotation can be arranged at an angle of between 45 and 90 degrees to the transverse and longitudinal plane of the vehicle, such as at 60 degrees to said plane. In any such case, the output shaft 88 of the speed transmission 32 can be arranged parallel to the input shaft 86 or at any other required angle.

In the present embodiment, the speed change transmission 32 is a continuously variable transmission (CVT). The detailed construction of the CVT transmission does not form part of the present invention and will be known to those skilled in the art. However, in brief the CVT comprises a primary pulley 90 associated with the input shaft 86, a secondary pulley 92 associated with the output shaft 88, and a drive belt 94 extending between the two pulleys.

Whilst it is preferred that the speed change transmission is a CVT, the transmission can be of any suitable type. For example, the speed change transmission can be a manual, sequential manual or automated manual gearbox, it may also be an automatic or semi-automatic gearbox.

Figure 5:
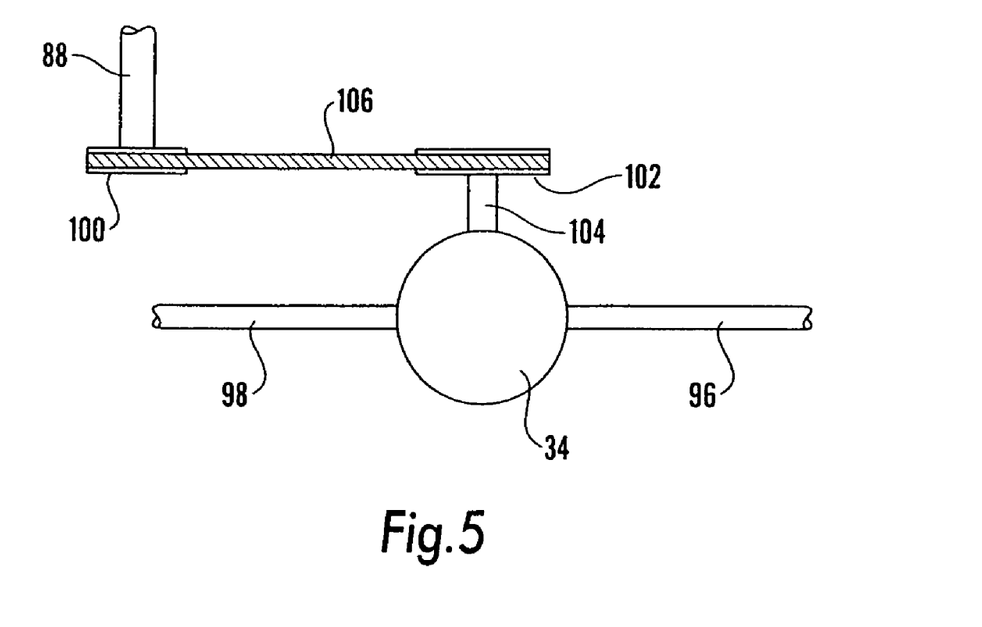
FIG. 5 is a partial, schematic view from the rear of the power train of FIGS. 2 and 3, showing a modification to the drive line.

The output shaft 88 of the CVT is connected to the differential 34 which drives the two rear wheels 16 by means of drive shafts 96, 98. In the present embodiment the input to the differential is positioned in line with the output shaft 88 of the transmission 32 enabling the output shaft of the transmission 88 to be connected, either directly or by means of one or more intermediate shafts, to an input shaft of the differential. However, in some embodiments it may be necessary to offset the differential relative to the output shaft 88 of the transmission 32. In this case, drive between the transmission output shaft 88 and the differential can be interconnected using any suitable means. FIG. 5 shows schematically an arrangement which allows the differential 34 to be offset relative to the output shaft 88 of the transmission. In this modification, a first drive sprocket 100 is mounted to the output shaft 88 of the transmission and a second drive sprocket 102 is mounted to an input shaft 104 of the differential and a drive chain 106 drivingly interconnects the first and second drive sprockets. This arrangement allows the input to the differential to be geared up or down if required. A drive belt and pulleys may be used instead of a chain and sprockets.

As has already been described, the marine propulsion unit 36 is connected to the marine propulsion output shaft 50 of the transfer box by means of drive shaft 52 which may be an extension of, or be connected to, an input shaft of the marine propulsion unit 36. Preferably the marine propulsion unit is a water jet but it could be of any suitable type, such as a marine propeller. In certain embodiments, more than one marine propulsion unit 36 can be provided, in which case drive from the transfer box 28 can be split between the marine propulsion units 36 in any suitable manner as will be readily understood by those skilled in the art.

Figure 6:
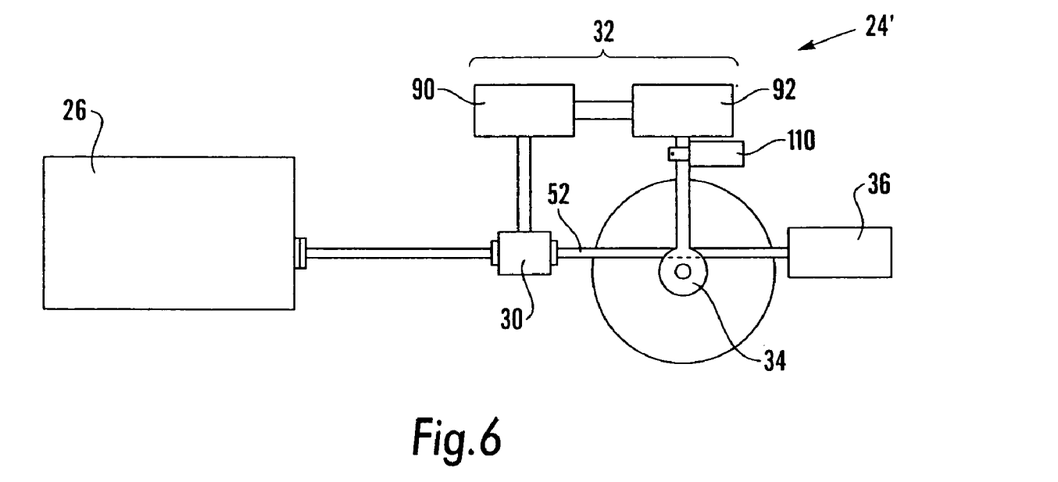
FIG. 6 is a view similar to that of FIG. 2, showing a further embodiment of a power train for use in an amphibious vehicle in accordance with the invention.

FIG. 6 shows an alternative embodiment of a power train 24' for use in an amphibious vehicle, such as that shown in FIG. 1. The same reference numerals are used to designate similar components to those described above with reference to the power train 24 shown in FIGS. 2 and 3.

The power train 24' is similar to the power train 24, except that the transfer box 28 is omitted and the marine propulsion unit 36 is driven through the bevel gear box 30. This arrangement permits the maximum possible power to be provided at the marine propulsion unit 36. At least one additional bevel gear (not shown) may be provided in the bevel gear box 30 to enable the drive for the marine propulsion 36 unit to be taken straight through. Alternatively, input shaft 40 may be made integral with output shaft 52.

Due to the omission of the transfer box, there is no provision in the drive line of a reverse gear for reversing the direction of drive from the prime mover 26 to the road wheels 16. Where reverse drive of the road wheels is required, this can be provided by means of a secondary power unit 110, such as an electric motor or engine, that is arranged to provide a reverse direction drive to the input of the differential 34. Advantageously, the secondary power unit 110 is an electric motor. A vehicle starter motor having a retractable Bendix drive is particularly suitable.

It should be noted that the secondary power unit 110 is shown schematically in FIG. 6 and its position can be varied as required.

Although not shown in FIG. 6, a clutch or other means for disconnecting drive from the prime mover 26 to the driven wheels 16 may also be provided.

Figure 7:
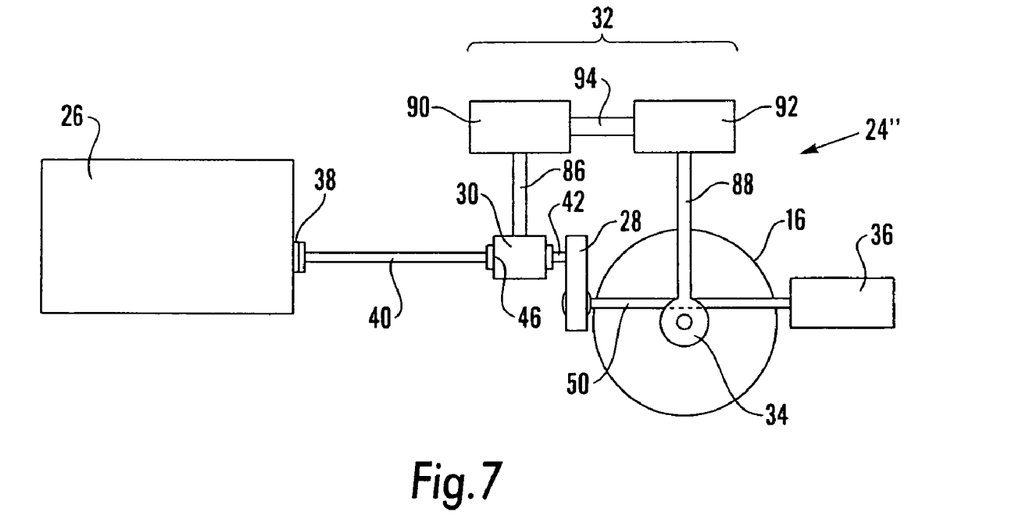
FIG. 7 is a view similar to that of FIGS. 2 and 6, showing a still further embodiment of a power train for use in an amphibious vehicle in accordance with the invention.

FIG. 7 shows a still further alternative embodiment of a power train 24" for use in an amphibious vehicle, such as that shown in FIG. 1. The same reference numerals are used to designate similar components to those described above with reference to the power train 10 shown in FIGS. 2 and 3 and 6.

In this embodiment, the transfer box 28 is arranged on the output side of a bevel gear box 30, in communication with the marine propulsion unit 36. The transfer box 28 incorporates a reduction gearbox type arrangement (not illustrated) for selectively controlling the drive to the marine propulsion unit 36.

Although not shown in FIG. 7, a clutch or other means for disconnecting drive from the prime mover 26 to the driven wheels 16 may also be provided.

It can be seen that the present invention provides a compact and versatile power train layout for an amphibious vehicle. By unusually positioning the speed change transmission such that its input shaft extends generally in a vertical direction of the vehicle, the speed change transmission can be positioned above or below the axis of the output shaft of the prime mover. This enables the overall length of the power train to be reduced and makes the power train particularly suitable for use in sit-astride type amphibious vehicles. Positioning the speed change transmission above the axis of the output shaft of the prime mover has the further advantage of raising the level of the transmission reducing the risk of it getting wet during use of the vehicle on water.

Whereas the invention has been described in relation to what are presently considered to be the most practical and preferred embodiments, it is to be understood that the invention is not limited to the disclosed arrangements but rather is intended to cover various modifications and equivalent constructions included within the scope of the invention. For example, whilst the bevel gear box 30 and the transfer box 28 are shown as separate components, it will be understood that the functions of the transfer box and the bevel gear box can be integrated into a single unit. Furthermore, it will be appreciated that where the speed change transmission is not a CVT, a clutch or fluid flywheel may be included in the power train to enable a smooth take up of drive from the prime mover 26. Furthermore, where four wheels are provided, they may all be driven.

A reverse gear may be provided for the marine propulsion unit, particularly to assist in removal of weed or other foreign matter. Also the marine propulsion unit may be permanently driven whenever the prime mover is operative; this may obviate the need for a flywheel.

Please note that as a further alternative arrangement (not illustrated), the transfer box 28 may be positioned upstream of bevel gear 30.

Whilst in the description above, the speed-change transmission is located at a level vertically higher than the level of the output shaft 40 and this is the preferred packaging, for some vehicles the speed-change transmission could be at a level vertically lower than the output shaft 40, in which case the input shaft 86 of the speed-change transmission would extend vertically downwards from the bevel gear box 30 and the output shaft 88 would extend vertically upwards from the speed change transmission.

While a particular form of the present invention has been illustrated and described, it will also be apparent to those skilled in the art that various modifications can be made without departing from the spirit and the scope of the present invention. Accordingly, it is not intended that the invention be limited except by the appended claims.

What is claimed is:

1. An amphibious vehicle for a user in a sit-astride position, the vehicle comprising a power train, the power train including a prime mover having an output shaft, a continuously variable transmission having an input shaft defining an axis of rotation, a differential through which at least two road wheels of the vehicle are driven, and a marine propulsion unit, the prime mover being arranged for driving the marine propulsion unit, and for driving at least two road wheels of the vehicle through the continuously variable transmission and differential wherein the continuously variable transmission is mounted such that the axis of rotation of its input shaft is angled relative to a plane including both transverse and longitudinal axes of the vehicle, and the axis of rotation of the continuously variable transmission input shaft is also angled relative to the output shaft of the prime mover, wherein said continuously variable transmission has an output shaft defining an axis of rotation and wherein the axis of rotation of said continuously variable transmission output shaft is substantially parallel to the axis of rotation of said continuously variable transmission input shaft and wherein the differential has an input shaft driven from the output shaft of the continuously variable transmission, in which the axis of rotation of the input shaft is generally orthogonal to said plane.

2. An amphibious vehicle as claimed in claim 1, in which drive is transferred from the output shaft of the continuously variable transmission to the input shaft of the differential through a drive chain or belt.

3. An amphibious vehicle for a user in a sit-astride position, the vehicle comprising a power train, the power train including a prime mover having an output shaft, a continuously variable transmission having an input shaft defining an axis of rotation, and a marine propulsion unit, the prime mover being arranged for driving the marine propulsion unit, and for driving at least one road wheel of the vehicle through the continuously variable transmission wherein the continuously variable transmission is mounted such that the axis of rotation of its input shaft is angled relative to a plane including both transverse and longitudinal axes of the vehicle, and the axis of rotation of the continuously variable transmission input shaft is also angled relative to the output shaft of the prime mover, wherein said continuously variable transmission has an output shaft defining an axis of rotation and wherein the axis of rotation of said continuously variable transmission output shaft is substantially parallel to the axis of rotation of said continuously variable transmission input shaft and further including a pair of bevel gears in the powertrain between the prime mover and the continuously variable transmission for transmitting rotation from said prime mover to said continuously variable transmission wherein said output shaft of said prime mover and said input shaft of said continuously variable transmission are oriented at 90 degrees relative to one another.

4. An amphibious vehicle as claimed in claim 3, in which the bevel gears are contained in a bevel gear box, the bevel gear box having an input shaft, a first output shaft for connection to an input shaft of the continuously variable transmission, the first output shaft having an axis of rotation orthogonal to the axis of rotation of the input shaft, the bevel gear box having a second output shaft for driving the marine propulsion unit, the axis of rotation of the second output shaft being in line with the axis of rotation of the input shaft.

5. An amphibious vehicle for a user in a sit-astride position, the vehicle comprising a power train, the power train including a prime mover having an output shaft, a continuously variable transmission having an input shaft defining an axis of rotation, and a marine propulsion unit, the prime mover being arranged for driving the marine propulsion unit, and for driving at least one road wheel of the vehicle through the continuously variable transmission wherein the continuously variable transmission is mounted such that the axis of rotation of its input shaft is angled relative to a plane including both transverse and longitudinal axes of the vehicle, and the axis of rotation of the continuously variable transmission input shaft is also angled relative to the output shaft of the prime mover, wherein said continuously variable transmission has an output shaft defining an axis of rotation and wherein the axis of rotation of said continuously variable transmission output shaft is substantially parallel to the axis of rotation of said continuously variable transmission input shaft and further comprising a secondary power unit to drive the at least one road wheel in a reverse direction of the vehicle.

6. An amphibious vehicle comprising a power train, a body and a seating position where a driver of the vehicle sits externally to the body and astride thereof, the power train including a prime mover having an output shaft, a speed-change transmission having an input shaft defining an axis of rotation, and a marine propulsion unit, the prime mover being arranged for driving the marine propulsion unit and for driving at least one road wheel of the vehicle through the speed change transmission, wherein the speed change transmission is mounted such that the axis of rotation of its input shaft is angled relative to a plane including both transverse and longitudinal axes of the vehicle, further including a pair of bevel gears between the prime mover and the speed change transmission for transmitting drive therebetween through an angle of between 45 and 90 degrees, wherein the bevel gears are contained in a bevel gear box, the bevel gear box having an input shaft, a first output shaft for connection to an input shaft of the speed-change transmission and a second output shaft for driving the marine propulsion unit.

7. An amphibious vehicle for a user in a sit-astride position, the vehicle comprising a power train, the power train including a prime mover having an output shaft, a speed-change transmission having an input shaft defining an axis of rotation and an output shaft defining an axis of rotation, a differential having an input shaft driven by said speed-change transmission output shaft and defining an axis or rotation and a marine propulsion unit, the prime mover being arranged for driving the marine propulsion unit, and for driving at least two road wheels of the vehicle through the speed-change transmission and differential, wherein the speed-change transmission is mounted such that the axis of rotation of its input shaft is angled relative to a plane including both transverse and longitudinal axes of the vehicle, and the axis of rotation of the speed-change transmission input shaft is also angled relative to the output shaft of the prime mover, wherein the axis of rotation of said speed-change transmission output shaft is substantially parallel to the axis of rotation of said speed-change transmission input shaft and wherein the axis of rotation of the differential input shaft is generally orthogonal to said plane further including a pair of bevel gears in the powertrain between the prime mover and the speed-change transmission for transmitting rotation from said prime mover to said speed-change transmission wherein said output shaft of said prime mover and said input shaft of said speed-change transmission are oriented at 90 degrees relative to one another.

8. An amphibious vehicle as claimed in claim 7, in which the bevel gears are contained in a bevel gear box, the bevel gear box having an input shaft, a first output shaft for connection to an input shaft of the speed change transmission, the first output shaft having an axis of rotation orthogonal to the axis of rotation of the input shaft, the bevel gear box having a second output shaft for driving the marine propulsion unit, the axis of rotation of the second output shaft being in line with the axis of rotation of the input shaft.

9. An amphibious vehicle for a user in a sit-astride position, the vehicle comprising a power train, the power train including a prime mover having an output shaft, a speed-change transmission having an input shaft defining an axis of rotation and an output shaft defining an axis of rotation, a differential having an input shaft driven by said speed-change transmission output shaft and defining an axis or rotation and a marine propulsion unit, the prime mover being arranged for driving the marine propulsion unit, and for driving at least two road wheels of the vehicle through the speed-change transmission and differential, wherein the speed-change transmission is mounted such that the axis of rotation of its input shaft is angled relative to a plane including both transverse and longitudinal axes of the vehicle, and the axis of rotation of the speed-change transmission input shaft is also angled relative to the output shaft of the prime mover, wherein the axis of rotation of said speed-change transmission output shaft is substantially parallel to the axis of rotation of said speed-change transmission input shaft and wherein the axis of rotation of the differential input shaft is generally orthogonal to said plane, further comprising a secondary power unit to drive the at least one road wheel in a reverse direction of the vehicle.

10. An amphibious vehicle for a user in a sit-astride position, the vehicle comprising a power train, the power train including a prime mover having an output shaft, a speed-change transmission having an input shaft defining an axis of rotation, and a marine propulsion unit, the prime mover being arranged for driving the marine propulsion unit by being permanently coupled thereto, and for driving at least one road wheel of the vehicle through the speed-change transmission, wherein the speed-change transmission is mounted such that the axis of rotation of its input shaft is angled relative to a plane including both transverse and longitudinal axes of the vehicle, and the axis of rotation of the speed-change transmission input shaft is also angled relative to the output shaft of the prime mover, wherein said speed-change transmission has an output shaft defining an axis of rotation and wherein the axis of rotation of said speed-change output shaft is substantially parallel to the axis of rotation of said speed-change transmission input shaft further including a pair of bevel gears in the powertrain between the prime mover and the speed change transmission for transmitting rotation from said prime mover to said speed-change transmission wherein said output shaft of said prime mover and said input shaft of said speed-change transmission are oriented at 90 degrees relative to one another.

11. An amphibious vehicle as claimed in claim 10, in which the bevel gears are contained in a bevel gear box, the bevel gear box having an input shaft, a first output shaft for connection to an input shaft of the speed change transmission, the first output shaft having an axis of rotation orthogonal to the axis of rotation of the input shaft, the bevel gear box having a second output shaft for driving the marine propulsion unit, the axis of rotation of the second output shaft being in line with the axis of rotation of the input shaft.

12. An amphibious vehicle for a user in a sit-astride position, the vehicle comprising a power train, the power train including a prime mover having an output shaft, a speed-change transmission having an input shaft defining an axis of rotation, and a marine propulsion unit, the prime mover being arranged for driving the marine propulsion unit by being permanently coupled thereto, and for driving at least one road wheel of the vehicle through the speed-change transmission, wherein the speed-change transmission is mounted such that the axis of rotation of its input shaft is angled relative to a plane including both transverse and longitudinal axes of the vehicle, and the axis of rotation of the speed-change transmission input shaft is also angled relative to the output shaft of the prime mover, wherein said speed-change transmission has an output shaft defining an axis of rotation and wherein the axis of rotation of said speed-change output shaft is substantially parallel to the axis of rotation of said speed-change transmission input shaft, further comprising a secondary power unit to drive the at least one road wheel in a reverse direction of the vehicle.

* * * * *